DATA RETRIEVAL SYSTEM

Filed Jan. 11, 1956

INVENTORS:
Cecil H. Burns, Jr.
Myron J. Mendelson
By Earl Beust
Louis A. Kline
John J. Matlago
Their Attorneys INVENTORS:
Cecil H. Burns, Jr.
Myron J. Mendelson
By Earl Beust
Louis A Kline
John J. Matlago
Their Attorneys.

INVENTORS:
Cecil H. Burns, Jr.
Myron J. Mendelson

By Carl Berst
Louis A. Kline
John J. Matlago
Their Attorneys.

Aug. 18, 1959 C. H. BURNS, JR., ET AL 2,900,132

DATA RETRIEVAL SYSTEM

Filed Jan. 11, 1956 9 Sheets-Sheet 4

INVENTORS:
Cecil H Burns, Jr.
Myron J. Mendelson
By Earl Beust
Louis A Kline
John J. Maclage
Their Attorneys.

INVENTORS
Cecil H. Burns, Jr.
Myron J. Mendelson
By Carl Berst
Louis A Kline
John J. Matlago
Their Attorneys.

INVENTORS:
Cecil H. Burns, Jr.
Myron J. Mendelson

By Karl Burst
Louis A. Kline
John J. Matlago
Their Attorneys.

Aug. 18, 1959 C. H. BURNS, JR., ET AL 2,900,132

DATA RETRIEVAL SYSTEM

Filed Jan. 11, 1956 9 Sheets-Sheet 7

INVENTORS:
Cecil H. Burns, Jr.
Myron J. Mendelson

By Earl Benst
Louis A Kline
John J. Matlago
Their Attorneys.

INVENTORS:
Cecil H. Burns, Jr.
Myron J. Mendelson
By Karl Bennett
Louis A. Kline
John J. Matlago
Their Attorneys.

Aug. 18, 1959 C. H. BURNS, JR., ET AL 2,900,132

DATA RETRIEVAL SYSTEM

Filed Jan. 11, 1956

9 Sheets-Sheet 9

INVENTORS:
Cecil H. Burns, Jr.
Myron J. Mendelson

By Earl Bernst
Louis A Kline
John J. Matlago
Their Attorneys.

United States Patent Office 2,900,132
Patented Aug. 18, 1959

2,900,132

DATA RETRIEVAL SYSTEM

Cecil H. Burns, Jr., Norwalk, and Myron J. Mendelson, Los Angeles, Calif., assignors to The National Cash Register Company, Dayton, Ohio, a corporation of Maryland Application January 11, 1956, Serial No. 558,510
13 Claims. (Cl. 235—61.7)

This invention relates to searching systems for information recorded in a magnetic tape file employed as an auxiliary memory for a digital computer and, more particularly, to means for locating individual records of the file possessing predetermined characteristics in common.

Searching systems with the ability to scan a large volume of magnetically recorded data have heretofore been known to be reliant on a recorded index or address associated with, for example, each account in the file. Such systems ordinarily require not only that the address of the account desired to be known to the searcher, but that the accounts be arranged on the tape such that their associated addresses are sequentially sensed, in numerical order, as the tape file is scanned. Sometimes the address of an account is an arbitrarily assigned number not having relevancy with regard to the data in the account itself. However, it is quite practical for the address to be a part of the data required to be specified in all accounts. Thus the data for a bank's accounts may be filed on a tape in order of increasing account number, the data for a retail merchandise may be filed by increasing stock numbers, etc. In summary, prior searching systems contemplate a file scannable with regard to addresses occurring in a numerical sequence, whether the addresses represent arbitrary tags or data.

The present invention circumvents the necessity of numerically ordered addresses. A comparator is provided for use during the scanning of an entire file of accounts to locate only those which possess predesignated characteristics in common, and these accounts only are arranged for subsequent read out. No numerical relation between successive accounts in the file need be specified and the addresses, with respect to which the file may be arranged, need not be referred to, since the comparator is responsive in accordance with the presence or absence of individual signals in the file, each representing an individual data unit. Otherwise stated, the invention provides for conducting a search through relevant data in all accounts in a file for a combination of data units representing a category of individual characteristics, and further provides for being able to operate on those accounts which conform with the category.

To illustrate, a tape may have a plurality of accounts recorded thereon, each corresponding to a loan carried by a bank and arranged such that one account is recorded in each block of words on the tape. At the culmination of a fiscal period, all accounts may be scanned to isolate those described as home mortgage types which involve principals not exceeding $2000, interest at 5%, a 2-year period and three or more months delinquency. Each of these characteristics, i.e., "home mortgage," "$2000," etc., comprises a data unit in a designated position of each account. Thus, when accounts possessing all predesignated data units are located by the tape unit and transmitted to the computer for proper presentation as a listing of all salient data in the accounts, the delinquency notices may be issued and a signal regarding the deliquency of the account is appropriately recorded on the tape. This type of search will be designated herein as "category search."

Briefly, the system of the present invention commences operation on receipt by the tape unit of a search signal directing a category search for signals on the tape corresponding to a plurality of binary signals subsequently transmitted by the computer. Each of these latter signals is statically stored in a register of the tape unit and represents one of a maximum of thirty-six data units characterizing a type of account in the file. After the binary signals are set up in the register, the tape drive is actuated to start the tape moving at high speed in the forward direction. Presuming that the tape had been initially positioned so that the magnetic heads used to sense information thereon are located at the beginning thereof, the process of scanning the entire area of the tape is commenced.

In the preferred embodiment of the invention, one of the words of each block, in which data relevant to an account is recorded, is arranged to contain the characteristic binary signals employed in the category search. The signals representing the sought information are read out of the register into the comparator, where they are compared with the characteristic signals read from each block of the tape, and transmitted to the comparator by the reader. This process is continued until a block from the tape is found to have a binary digit one in every position where there is a corresponding binary digit one signal stored in the register. When this condition obtains, i.e., a record with the prescribed characteristics is found, the tape automatically stops, reverses direction, and moves to the beginnng of the appropriate block, thus placing the account in position to be read from the tape. It should be noted that upon location of a block conforming with the category criteria, the computer may be directed to cause the tape unit to read out the block and then continue the category search until the entire tape has been scanned.

It is thus apparent that it is the broad object of the invention to provide a business with an analytical tool having the ability to scan its records for information matching any prescribed set of characteristics.

Another object of the invention is the provision of means to conduct a category search with regard to any of a plurality of characteristics describing the accounts recorded on a magnetic tape file, thereby resulting in an advanced degree of search effectiveness.

Another object of the invention is to provide a tape unit structure possessing a high degree of reliability, versatility, and utility.

Another object of the invention is the provision of a control unit for sequentially rendering the circuits of the tape unit effective to perform the search operation.

Other objects and many of the attendant advantages of this invention will become readily appreciated as the same become better understood by reference to the preferred embodiment detailed in the following description and the accompanying drawings wherein.

Figures 11, 11A, 12:
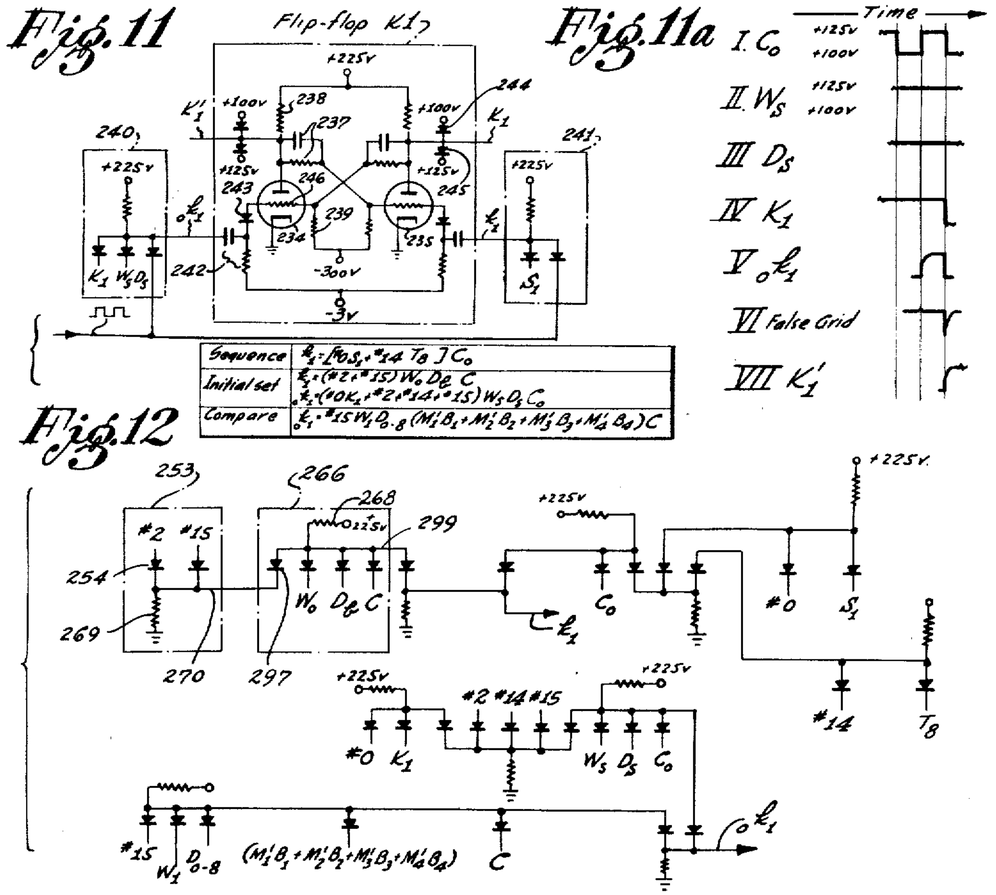
Figure 10:
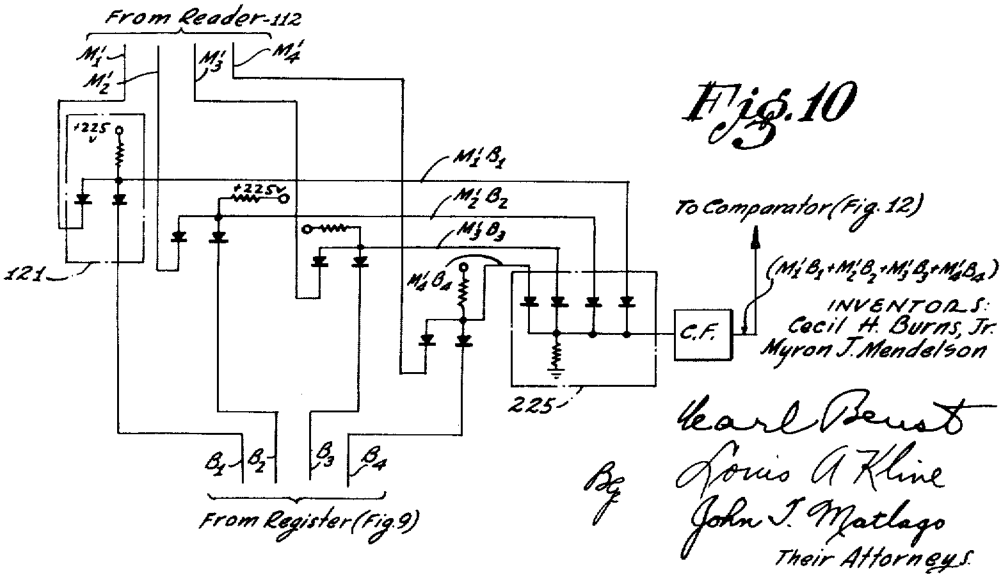
Fig. 10 is a diagram of the network section of the comparator which generates the output defining the results of a category search.

Fig. 11 presents the schematic diagram and logical equations for flip-flop K1 of the comparator.

Fig. 11*a* is a graph of the waveforms concerned with the ${}_0k_1$ triggering equation during step operation #0.

Fig. 12 shows the network for flip-flop K1 of the comparator.

Figure 13:
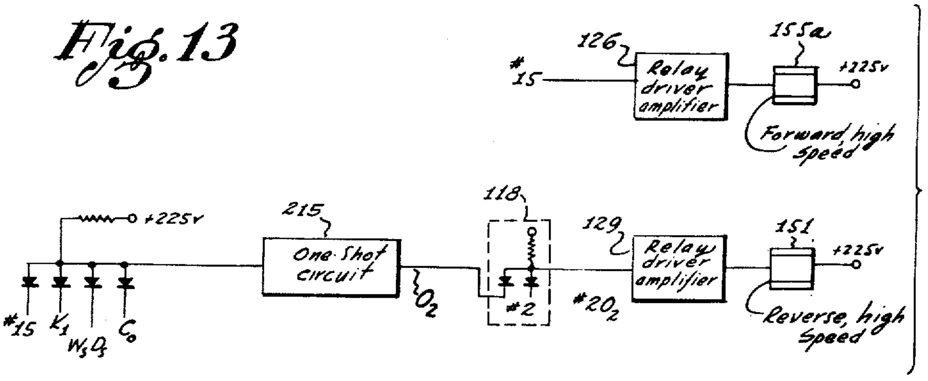

Fig. 13 shows a diagram of the tape drive control.

Figure 14:
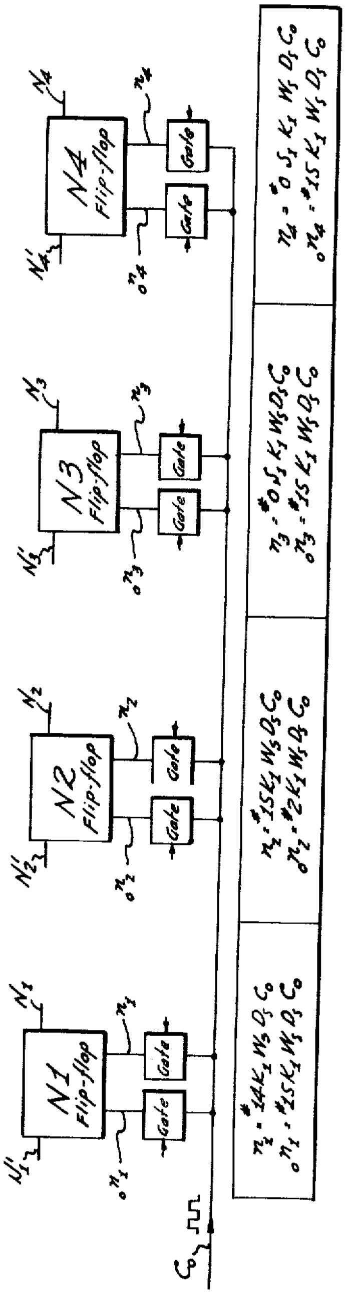

Fig. 14 presents the block diagrams and logical equations for flip-flops N1 to N4 of the control unit.

Figure 15:
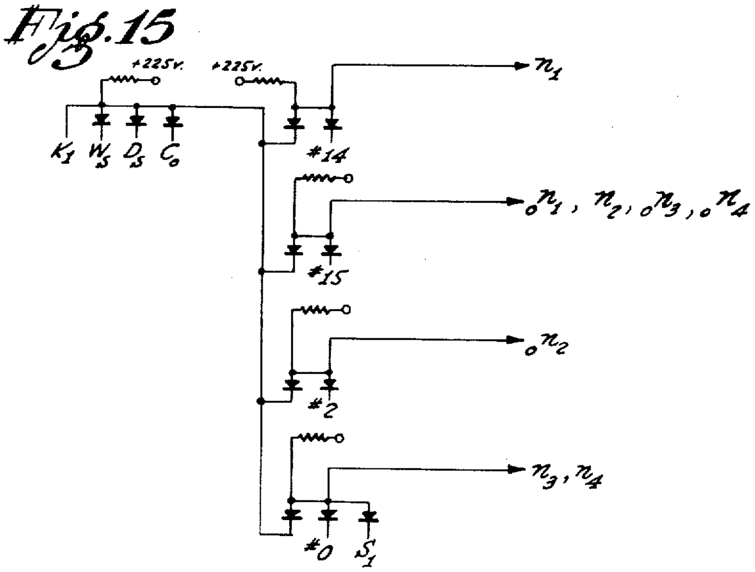

Fig. 15 shows the networks for flip-flops N1 to N4 of the control unit.

Figure 16:
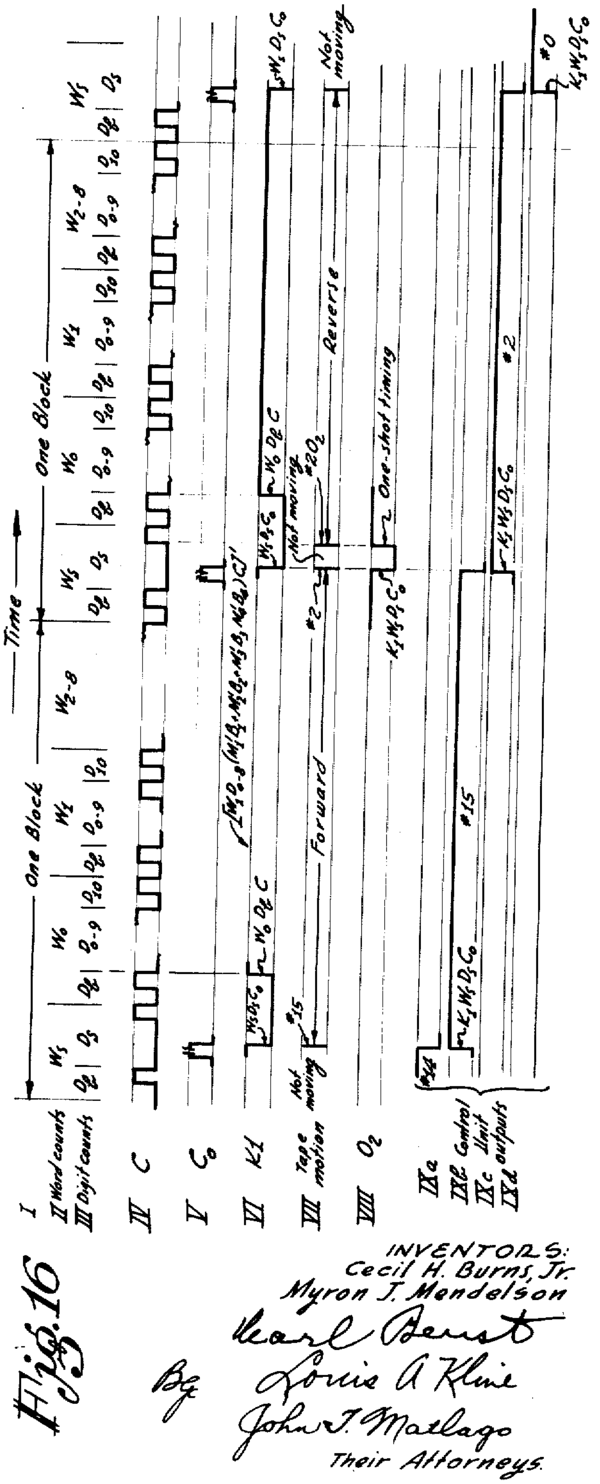

Fig. 16 shows graphs of tape unit activity during a category search.

Figures 7, 17, 18:
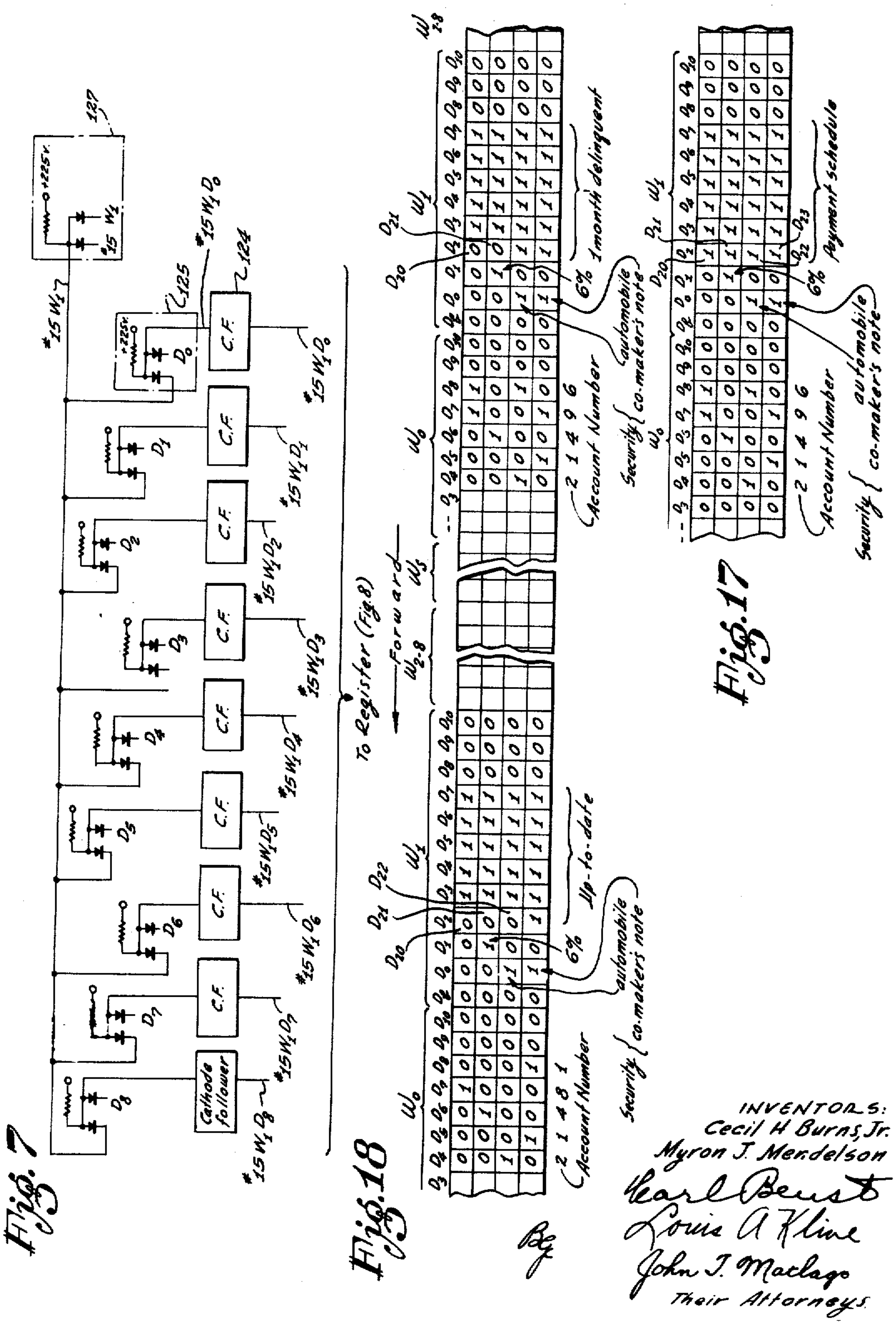
Fig. 7 is a diagram of the register circuitry which generates output timing signals.

Fig. 17 presents an example of initial category search data recorded on a section of the tape.

Fig. 18 presents an example of modified category search data recorded on a section of the tape.

The invention is herein disclosed with reference to a general purpose computer such as that described in a copending application for patent, Serial No. 325,144, filed December 10, 1952, operatively connected to a magnetic tape unit such as that described in a copending application for patent, Serial No. 462,752, filed October 18 1954. It is thus of necessity that frequent mention will be made in this specification to the referenced specifications. This specification and the accompanying drawings will describe and illustrate in detail only such portions of these devices as are directly concerned with the present invention and are necessary to explain the principle and operation thereof, or require modification to provide therefor.

Figure 1:
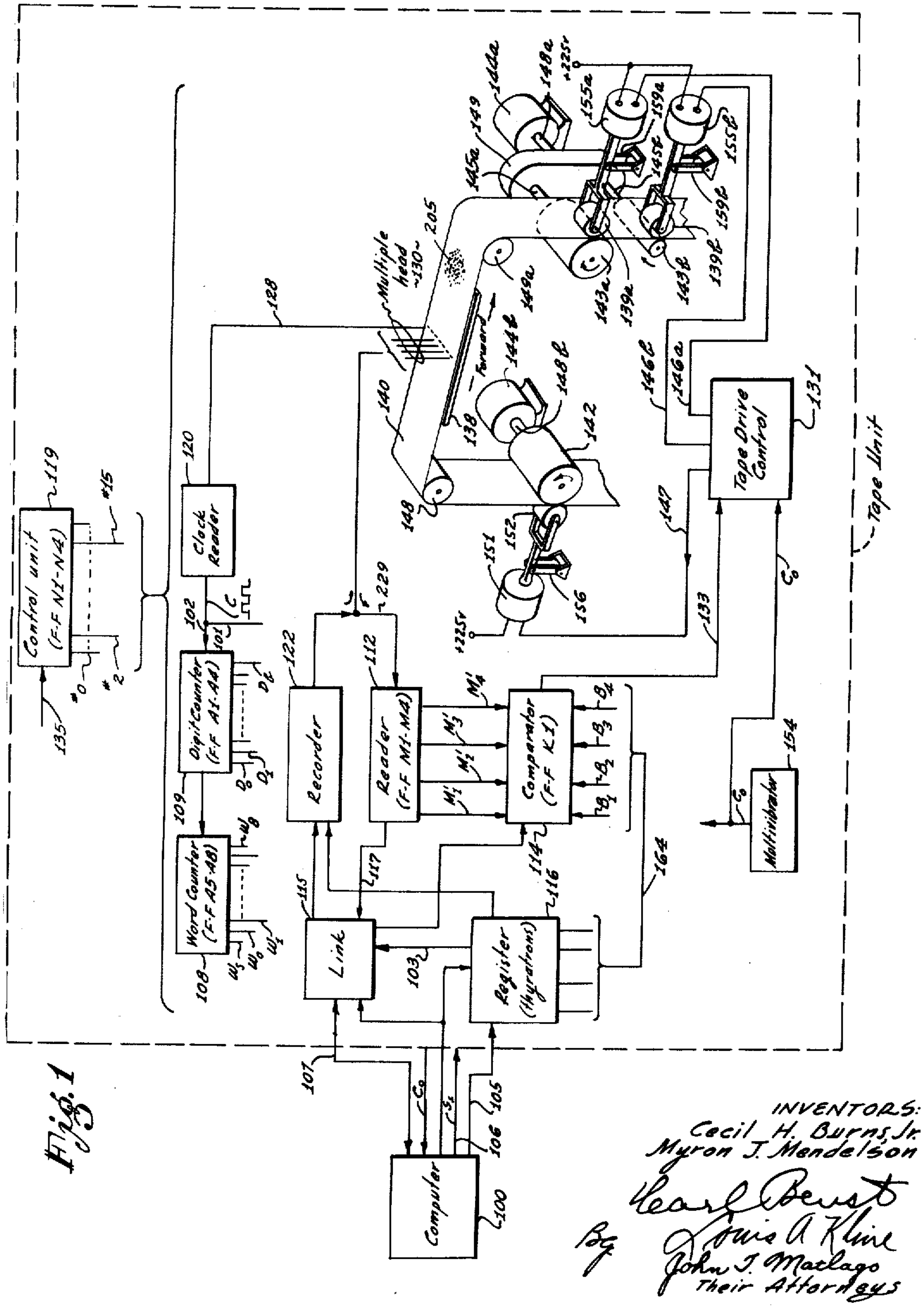
Fig. 1 is a block diagram showing the cooperative relation of the various components of the magnetic tape storage system embodying the present invention.

Referring to Fig. 1, a general diagram of the tape unit incorporating the preferred embodiment of the present invention is shown. It will be understood that this block diagram has been simplified to emphasize the operative relationships between the components which combine to comprise the tape unit. Information received by the tape unit, shown within the dashed line of Fig. 1, is from computer 100, such intelligence having been recorded therein by any means known in the art. In form, this information comprises electrical pulse signals, or combinations thereof, transmitted by way of one or a plurality of connecting lines.

With specific regard to signals which are recorded on tape 140, these signals are received by link 115 on line 107, switched to recorder 122 and recorded by multiple head 130. This process has been completely described in the cited application, Serial No. 462,752. Consequently, it will be assumed that tape 140 contains a file of entries or accounts representing statistical records maintained continuously by a business establishment. The form of the entires will be reserved for later discussion.

With specific regard to category search, an operational instruction signal $S_1$ is transmitted via line 106, which, it will be understood, connects to several tape unit components, comparator 114, and control unit 119 in particular.

Instruction signal $S_1$ is followed by 36 data unit or characteristic signals transmitted and received in groups of four set up simultaneously on four lines, each group accompanied by a timing signal, $T_0$, $T_1$, etc., on one of nine lines. The 13 lines for these signals are collectively designated as line 105 from computer 100 to register 116. As will be shown, for the category search operation, the data unit signals are stored in thyratron circuits in register 116 during the category search operation.

Figure 2:
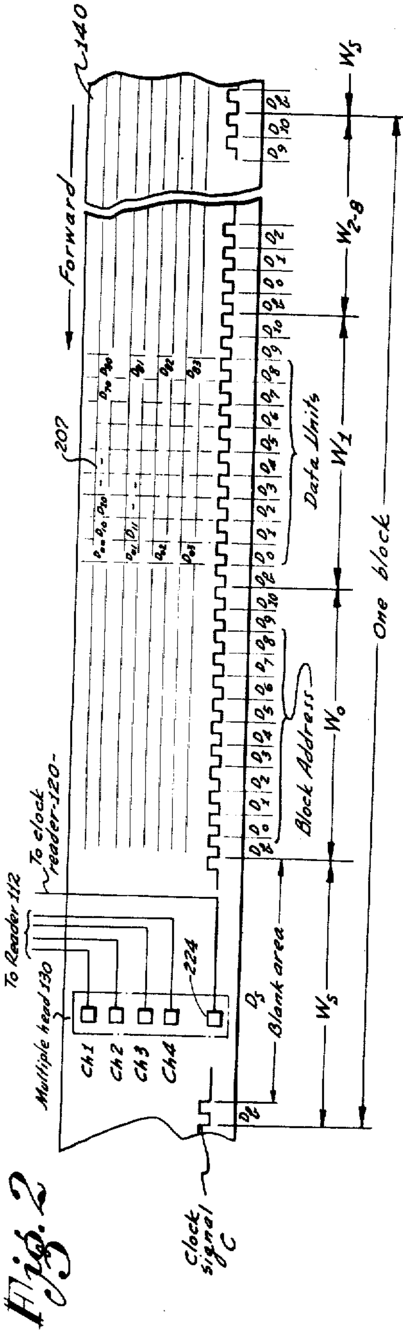
Fig. 2 shows the details of how information is recorded on a section of magnetic tape.

Referring momentarily to Fig. 2, a drawing of a section of tape 140, it is seen that provision is made for four effective information channels, *Ch*1 to *Ch*4, and a channel for a repetitive clock signal C. It is noted that duplication of channels, ordinarily required for effective reading of signals, has been omitted in order to simplify the presentation. The unit areas of saturation, such as area 207, are defined longitudinally by the permanently recorded clock signal and transversely by the fixed positions of the individual heads, such as head 224, in multiple head 130.

Figures 3, 4, 5:
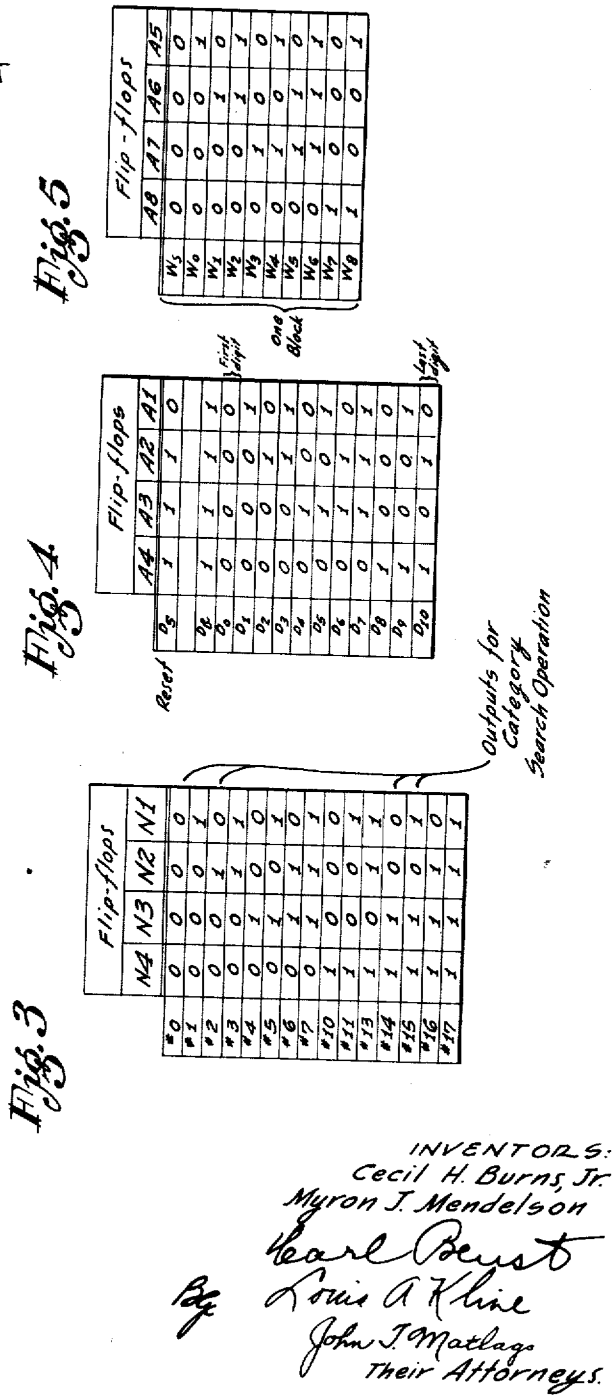
Fig. 3 is a table showing the states of the control unit flip-flops N1 to N4 for each of the step operations of which the tape unit embodying the invention is capable.
Fig. 4 is a table showing the states of the digit counter flip-flops A1 to A4 for each of the digit periods on the tape of Fig. 2.
Fig. 5 is a table showing the states of the word counter flip-flops A5 to A8 for each of the word periods on the tape of Fig. 2.

As shown, the surface of tape 140 is divided lengthwise into blocks. Each block comprises a blank area on which no clock signals are recorded, and an area on which clocks signals C are recorded, the latter being divided into words $W_0$, $W_1$, etc. and further into digit position periods designated by reference to counts $D_0$, $D_1$, etc. of digit counter 109 (Fig. 1). As shown in table form in Fig. 4, the digit counts sequence binarily in correspondence with the second, or $D_0$, period, to the eleventh, or $D_{10}$, period of a word, the first period being designated symbolically as $D_b$. It is noted further that identification of words of a block is made with reference to word counter 108, the sequential count $W_s$, $W_0$, $W_1$, etc. therefor being shown in Fig. 5. In summary, from Fig. 2, a block on tape 140 is comprised of nine words $W_s$, $W_0$, $W_1$, . . . $W_8$, each of which, except word $W_s$, is provided with twelve digit periods $D_b$, $D_0$, $D_1$, . . . $D_{10}$, word $W_s$ being characterized by the signal period $D_b$ followed by blank area $D_s$. Accordingly, by noting the counts in the two counters together, succeeding digit periods on tape 140 are identified as $W_0D_b$, $W_0D_0$, $W_0D_1$, . . . $W_8D_{10}$ with the portions identified as the blank area designated as $W_sD_b$ and $W_sD_s$.

The means employed in the counters to identify digit positions on tape 140 so that circuitry in the tape unit may be arranged to provide proper triggering flip-flops, as required by their associated equations, is well understood in the art. Briefly, from Figs. 4 and 5, it is seen that combinations of outputs from flip-flops A1 to A4 for digit counter 109 and flip-flops A5 to A8 for word counter 108 provide the respective counts.

In the preferred embodiment of tape 140, shown in Fig. 2, recorded in period $D_b$ of each word in the block is the reference zero employed to reset the memory circuitry as required in a non-return-to-zero system. Periods $D_0$ to $D_8$ of word $W_0$ are reserved for the block address, while these periods of word $W_1$ are reserved for information which is searched for on receipt of a category search signal, and carry the position designations $D_{00}$, $D_{01}$, $D_{02}$, . . . $D_{83}$ to identify individual binary digits thereof. It is apparent that recordings are made in a word, by the multiple head 130, in groups of four binary digits.

Referring again to Fig. 1, the mechanics of motion of tape 140 will be described. Motors **144*a* and 144*b* are essentially identical induction motors, shafts 148*a* and 148*b* of which are constantly rotating when the tape unit is energized. Thus capstans 142, 143*a*, and 143*b* are also constantly rotating, the latter two by way of gear box 149 and shafts 145*a* and 145*b*. It should be understood that the direction of rotation of capstan 142 is opposite to that of capstans 143*a* and 143*b*, as shown by the arrows associated therewith. Further, it is seen that capstan 143*a* is larger in diameter than capstan 143*b*, thereby possessing a higher peripheral speed, and that capstan 142 is of the same diameter as capstan 143*a*. Tape 140 is threaded between capstan 142 and roller 152, over idler 148, between the upper surface of stationary support 138 and the multiple head, over idler 149*a* and between capstans 143*a* and 143*b* and their opposing rollers 139*a* and 139*b*, respectively. The magnetically sensitive surface 205 of tape 140** is uppermost, as shown.

Tape 140 is moved in the forward direction at high speed during searching operations and at low speed during the reading or recording operations, the forward direction being from left to right, as indicated. Tape 140 is moved in the reverse direction at high speed during searching operations only.

Motion of tape 140 is accomplished, for instance with regard to the reverse direction, by pressing roller 152, which is rubber surfaced and free rolling, against capstan 142, thereby almost instantaneously setting tape 140 moving at the peripheral speed of capstan 142. Roller 152 is moved by way of mechanical link 156 and solenoid 151 which is energized via line 147 by tape drive control 131. Motion of tape 140 in the forward direction is similarly accomplished by employing the combination of capstan 143a, roller 139a, and link 159a upon energizing solenoid 155a via line 146a for high speed, or the combination of capstan 143b, roller 139b, and link 159b upon energizing solenoid 155b via line 146b for low speed.

When tape 140 is in motion, the recorded clock signal (Fig. 2) is sensed by head 224 of multiple head 130, converted thereby to a voltage which is transmitted by line 128 to clock reader 120. The output of clock reader 120 is clock signal C, a square wave voltage clamped between the potential of +125 v. and +100 v., these potentials being those for which the logical networks of the tape unit are arranged to respond. Further, it should be understood that the tape unit basic timing logic is in synchronism with the trailing edge of signal C. Signal C, it is seen, is fed to word counter 108 and digit counter 109 by line 102, and to other tape unit components by line 101.

Since signal C is generated only when tape 140 is in motion, provision is made to substitute an auxiliary source of square wave pulses $C_0$ for supplying the components of the tape unit when the tape is not moving. This source is provided by multivibrator 154 which continuously generates the electrical square wave signal $C_0$. As will be shown, the trailing edge of signal $C_0$ is employed for triggering logical circuitry whenever signal C is not available.

Before describing the details of the circuitry in the preferred embodiment of the invention, the convention of the logical methods employed will be described. Logical propositions may be considered to be represented by conditions of flip-flop circuits. When a flip-flop is in one condition, the proposition is considered to be "true" (or the flip-flop is said to be storing a binary one). When the flip-flop is in the other condition, the proposition is considered to be "false" (or the flip-flop is said to be storing a binary zero). The true and false conditions of a proposition are preferably referred to as terms which are each represented by a D.C. voltage on respective one of the output lines from the flip-flop. When a voltage on an output line is high (+125 v.), the term it represents is effective; and when the voltage on an output line is low (+100 v.), the term represented is ineffective. In accordance with the present scheme, in order to trigger a proposition flip-flop to either its true or false state by signals applied thereto on separate inputs, an input line is coupled to the grid of each of the tubes of the flip-flop.

The nomenclature employed for the present invention uses combinations of capital letters and numbers for designating the proposition flip-flop themselves. The outputs of the flip-flops are characterized by corresponding capital letters with the number as a subscript. In order to characterize the true state of a proposition flip-flop from its logical inverse, the latter is distinguished from the former by an affixed prime. As for the inputs to a flip-flop, these are designated by corresponding lower case letters with the associated number as a subscript. The input which, when energized, renders a flip-flop into a false state is further characterized by a subscript zero prefixing the lower case letter.

As shown in Fig. 11, the circuit of flip-flop K1 comprises triodes 234 and 235 arranged such that the plate of each is intercoupled to the grid of the other by a resistor-capacitor combination, such as 237. Each plate is provided with a load resistor, such as 238, through which it is connected to +225 v. D.C.; each grid is provided with a resistor, such as 239, through which it is connected to −300 v. D.C.; and each cathode is grounded. The inputs to the grids of triodes 234 and 235 are from gating circuits 240 and 241, respectively, during, for instance, step operation #0 of Fig. 6, as will be shown later. The gating circuit outputs are differentiated and clipped by networks, such as 242, and diodes, such as 243, so that negative pulses of appreciable magnitude only are applied to the grids of the triodes. The output from each triode is from the plate and is clamped between +100 v. D.C. and +125 v. D.C. by diodes, such as 244 and 245.

If, for example, flip-flop K1 is true, a negative pulse applied to grid 246 will cut triode 234 off, thereby causing output $K_1'$ to be high. This pulse is provided by an output from gate 240 (i.e., all of the input signals representative of terms $K_1$, $W_sD_s$, and $C_0$ simultaneously at the high potential of +125 v. D.C.). When waveform $C_0$ abruptly falls to the potential of +100 v. D.C., the differentiation of the fall produces a pulse which acts as the requisite negative-going trigger.

For the presentation of other flip-flop circuits, resort will be made to block diagrams to represent the schematic form, as illustrated by Fig. 14 for flip-flops N1 to N4, and the Boolean equations which define when and how the flip-flop circuit is to change will be shown with the block diagram. Also, the networks represented by the equations will be presented as in Fig. 15 for the abovementioned flip-flops.

The action of flip-flop K1, in accordance with the equation shown, will be further explained by the waveforms of Fig. 11*a*. These graphs show how flip-flop K1 is triggered false from a prior true condition as the result of the equation ${}_0k_1=K_1W_sD_sC_0$ (Fig. 11), which is effective during step operation #0 of Fig. 6, as will be subsequently described. Line I represents signal $C_0$. Lines II and III show the output of counting circuits 108 and 109 which defines period $W_sD_s$, this output being effective because, during step operation #0, tape 140 is not moving. During period $W_sD_s$, diode networks are arranged by control unit 119 to make flip-flop K1 responsive to signal $C_0$ trigger pulses which will take effect provided the flip-flop is in the true state. In line IV this provision is shown to be met. It is thus only when a pulse $C_0$ is present that an effective false input ${}_0k_1$ (line V) will be generated. However, flip-flop K1 will be triggered false only by a negative-going pulse applied to its false grid. This pulse occurs, as shown in line VI, when input ${}_0k_1$ sharply drops to a low potential at the fall of signal $C_0$. Thus, as line VII shows, the output $K_1'$ swings to a high potential.

Logical product and sum networks (gates and mixers, respectively) are illustrated in Fig. 12, which shows, for the present invention, the complete triggering circuitry for flip-flop K1. Thus, for example, the equation (Fig. 11):

$$k_1=(\#2+\#15)W_0D_bC$$

is interpreted as meaning that flip-flop K1 will be triggered into the true state at the end of the clock period during which the term (#2+#15) and the term $W_0D_b$ are at high potentials, where the term (#2+#15) itself will be at a high potential whenever the term #2 or the term #15 is at a high potential.

Thus, in Fig. 12, the portion of the diode network enclosed within block 266 is a typical gate network. In such a circuit, signals having voltage levels of either +100 v. or +125 v. are obtained from the sources indicated and applied on the cathode-ends of crystal diodes, such as 297, whose anode-ends are joined to common line 299 connected to positive source +225 v. through product resistor 268.

Any time all the diode input signals to gate 266 are at the high potential of +125 v., the output on line 299 swings to this high potential. If any one of the input signals is at the low potential of +100 v., the output on line 299 is at this low potential.

A typical mixer network, enclosed within block 253, is connected as one of the inputs to gate 266. Mixer 253 is comprised of input diodes, such as 254, whose cathode-ends are joined to common line 270 and returned to ground through sum resistor 269. The input signals to this circuit are applied on the anode-ends of the diodes. Whenever any one of the inputs to mixer 253 is at the high potential of +125 v., the output on line 270 is at this high potential.

It is also evident that gate 266 is interconnected with other gates and mixers to form a large diode network, whose output, namely term $k_1$, drives a grid of flip-flop K1.

Returning to Fig. 1, in reading information from tape 140, the four binary digits recorded in each digit period are simultaneously sensed by multiple head 130 and transmitted in electrical form on four separate conductors, schematically represented as line 229, to reader 112. These binary signals, after amplification, clipping and clamping, are combined in logical networks with signal C to form the inputs to four memory flip-flops M1, M2, M3, and M4 in reader 112. The "false" outputs of flip-flops M1 to M4 are fed on respective separate conductors to comparator 114 which, during search operations, compares the information read from tape 140 with the information stored in register 116, and more specifically, during category search, compares the outputs $M_1'$, $M_2'$, $M_3'$, and $M_4'$ with register information represented as $B_1$, $B_2$, $B_3$, and $B_4$. The true outputs of flip-flops M1 to M4 are also fed on four separate conductors, symbolically represented as line 117 in Fig. 1, to link 115 which, during the read operation, supplies these outputs to the computer.

When it is desired to locate particular information previously recorded on tape 140 employing the category search operation, the category search operational signal, designated as $S_1$, is transmitted from the computer 100 to the tape unit by line 106, and is followed by signals on line 105 representing binary digits, designated as "bits," comprising the data units to be searched for. The signal $S_1$ causes control unit 119 (Fig. 6) to set up logical networks whereby the category search operation is accomplished, including setting up the information signals in register 116.

The information signals are sequentially read out of register 116 in the form of outputs $B_1$, $B_2$, $B_3$, $B_4$ and transmitted by line 164 in Fig. 1 to comparator 114. In comparator 114, these outputs are compared with information read from words $W_1$ on tape 140, this information being in the form of the false outputs from flip-flops M1 to M4. The results of the comparison are set up in flip-flop K1. A successful comparison, for which flip-flop K1 is maintained in a true state, indicates that there is a binary digit "one" in a word $W_1$ on tape 140 for each binary digit "one" set up in register 116. The outputs from flip-flop K1 are sent to tape drive control 131 by line 133 to cause tape 140 to stop moving, and are also sent to control unit 119 by line 135 to cause networks to become effective whereby tape 140 will be reversed in direction and stop at the beginning of the block for which the comparison was successful.

In the present tape unit, the activity corresponding to the receipt of an instruction signal $S_1$ from the computer occurs in discrete steps, ordered by control unit 119, which sequentially renders networks operable in order to accomplish this purpose. Accordingly, each output count signal, #0, #1, . . . #17 from control unit 119 selects certain networks which respond to existing propositions in similar networks to generate additional propositions the same as or different from the existing propositions.

The content of control unit 119 is subject to being changed only when the count in word counter 108 corresponds to $W_s$, and the count in digit counter 109 corresponds to $D_s$, i.e., when multiple head 130 is over the blank area on tape 140 (regardless of motion of tape 140), and flip-flop K1 is in the true state, i.e., output $K_1$ is high. As will be shown, the state of flip-flop K1 is dependent on signals received from computer 100 as well as signals from tape unit components. Thus, if, during period $W_sD_s$, flip-flop K1 is false, existing networks are not changed and existing logical propositions are not affected. However, if, during period $W_sD_s$, flip-flop K1 is true, existing networks may be modified and other logical propositions may be generated.

Figure 6:
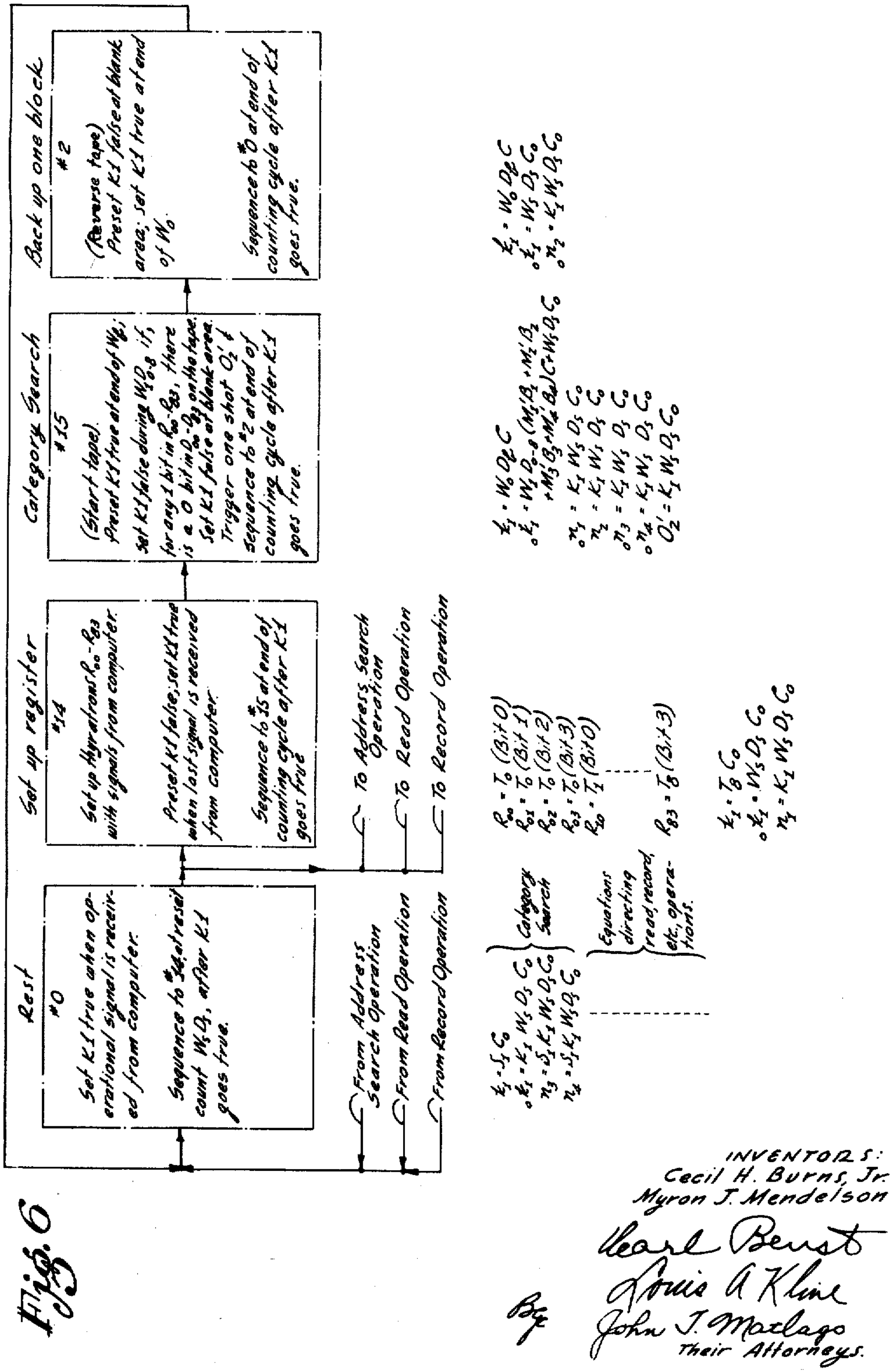
Fig. 6 is an extract from the tape unit flow diagram showing the step operations concerned with the category search operation.

Reference to Fig. 6 will clarify the action of control unit 119. This figure presents the portion of the tape unit flow diagram relevant to the process of searching for a category, and shows how step operations are arranged in sequence to accomplish this search when computer 100 transmits category search signal $S_1$ to the tape unit. As noted, each step operation is represented by a dashed rectangle or block identified by a number, such as #0, corresponding to an output of control unit 119. Each such block represents diagrammatically a set of logical operations to be performed serially by diode networks in the tape unit on information set up in or sensed by various of the components during the time that the particular configuration corresponding to the block number is set up. The flow diagram shows the sequence in which control unit 119 changes in content, thus automatically directing the order in which operations are performed by the tape unit. As will be shown by the logical equations thereunder, and the brief corresponding statements therein, each rectangle does not represent a fixed time period; networks may remain static, even when tape 140 is moving for a considerable period of time, often exceeding the time required for a plurality of word blocks to pass the multiple head. The outputs of control unit 119 are expressed as octal numbers, and those indicated in Fig. 3, but not detailed in Fig. 6, are generated during the read, record, and block search operations not relevant here.

Particular reference will next be made to Fig. 6 which shows the extract of the tape unit flow diagram relevant to the category search sequence.

The activity represented in Fig. 6 will first be briefly summarized. Initially, the tape unit resides in a rest condition (block #0) when not engaged in an operation. For the category search operation, register 116 is set up (block #14) with signals from the computer, corresponding signals from tape 140 are sought (block #15), tape 140 is positioned, i.e., backed up (block #2) such that the first block read in a subsequent read operation contains the information located, and lastly, the tape unit returns to the rest condition (block #0).

Referring to block #0, the first statement made therein is that flip-flop K1 is set true when category search signal $S_1$ is received from the computer. This is symbolically represented by the equation: $k_1=S_1C_0$ presented below block #0. It will be understood that while the tape unit is in block #0, the maintenance of the output #0 of control unit 119 (Fig. 3) requires that flip-flop K1 be false since control unit flip-flops N1 to N4 are triggered during period $W_sD_s$ by the fall of a multivibrator 154 pulse $C_0$ when flip-flop K1 is true. This is indicated by the $n_3$ and $n_4$ equations which advance the program to the operations of block #14 by setting flip-flops N3 and N4 true on receipt of signal $S_1$ when flip-flop K1 is in the true state. The function of the equation ${}_0k_1=K_1W_sD_sC_0$ is to preclude a true state of flip-flop K1 longer than is necessary to set up flip-flops N3 and N4 and sequence to block #14; otherwise progressive sequencing through block #14 to block #15 may occur prior to accomplishing the functions included in block #14.

It is in block #14 that register 116 is set up with signals from the computer representing information to be sought. Register 116 is shown in Figs. 7, 8, and 9, of which only Fig. 8 is of concern in the setting-up process.

Figure 8:
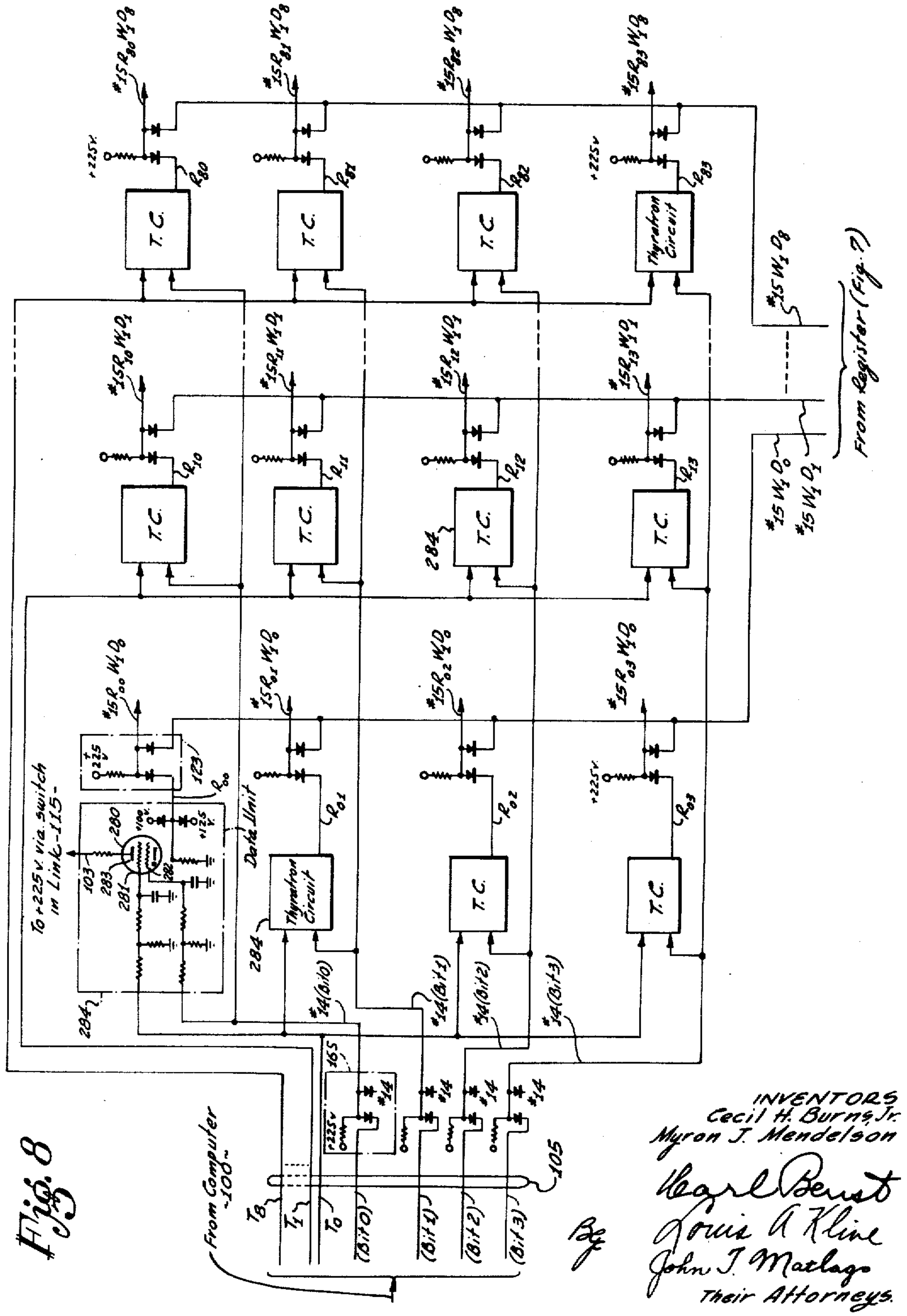
Fig. 8 shows the portion of the register for storing the characteristic signals by which the search is conducted.
Figure 9:
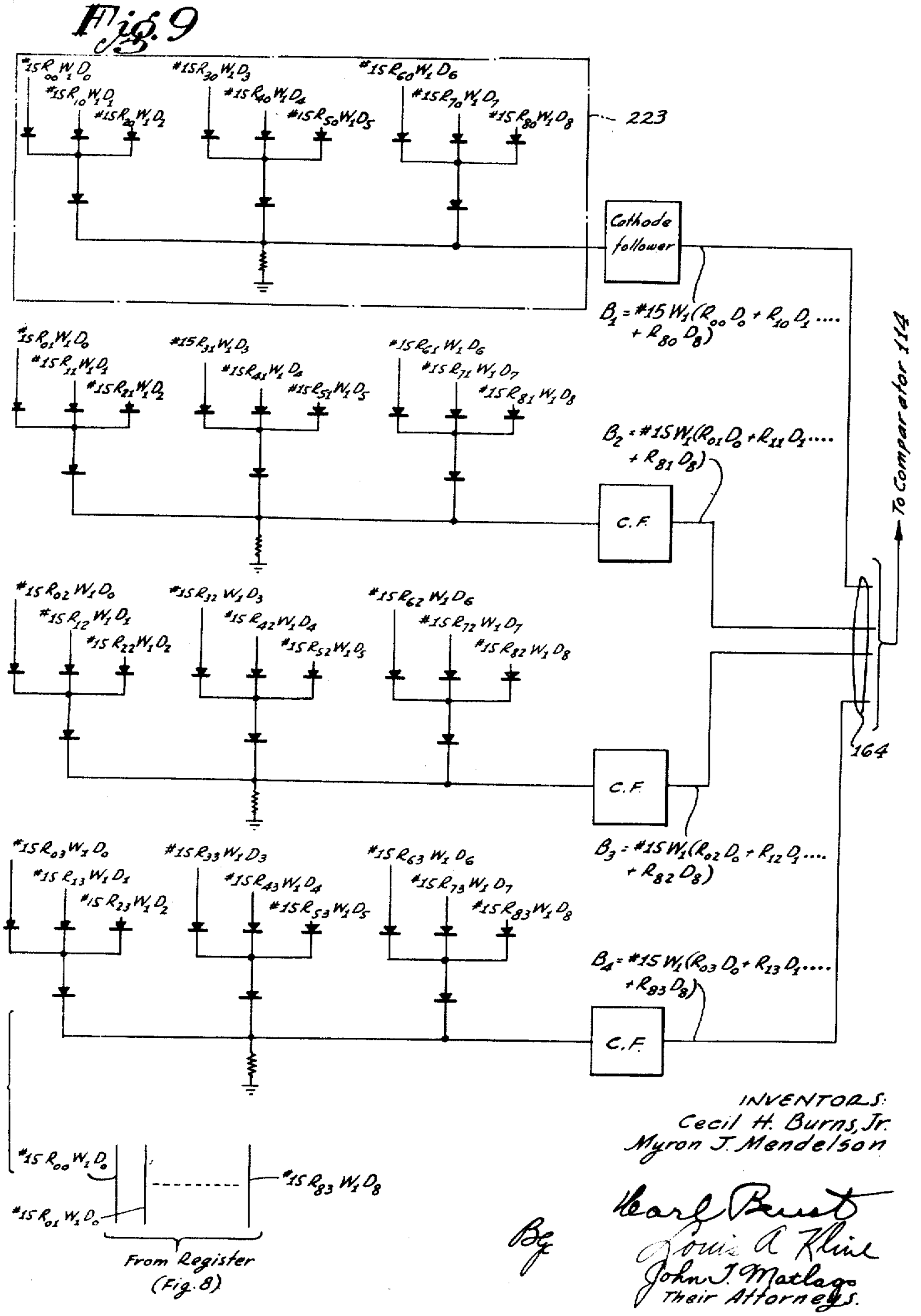
Fig. 9 is a diagram of the register output circuitry.

Information signals from the computer are received on four lines, labelled in Fig. 8 as conveying signals (Bit 0) to (Bit 3), corresponding to the four binary digits which are simultaneously transmitted, and each of which represents a data unit. Each of these lines is gated by output #14 from control unit 119 in a logical gate such as gate 165 for signal (Bit 0). The reason for the gating is that these signals represent outputs of flip-flops in the computer and may be present on their respective lines at times when the tape unit is executing other operations or is in other portions of the category search operation, in which cases it is desired that they should not be permitted to affect the information presently stored in register 116.

It is noted that the elements employed in the present embodiment for storage of information to be searched for are 36 thyratron circuits 284 having outputs $R_{00}$ to $R_{83}$. Each thyratron circuit 284 is set up during block #14 to store a binary digit of information, corresponding to the 36 binary digits in the category search portion of word $W_1$ (Fig. 2) stored in positions $D_{00}$, $D_{01}$, etc. Each of the lines conveying a gated binary digit is connected to control grid 282 of each of nine thyratron tubes 280. Thus the line for signal #14 (Bit 0) is connected to thyratron circuits having outputs $R_{00}$, $R_{10}$, $R_{20}$, . . . $R_{80}$.

Timing signals from the computer are received on nine lines, labelled in Fig. 8 as conveying signals $T_0$ to $T_8$, corresponding to nine sets of four binary digits which register 116 is capable of storing. Each of these lines is connected to shield grid 281 of each of four thyratron tubes 280. Thus the line conveying signal $T_0$ is connected to thyratron circuits having outputs $R_{00}$, $R_{01}$, $R_{02}$, and $R_{03}$, the line conveying signal $T_1$ is connected to thyratron circuits having outputs $R_{10}$, $R_{11}$, $R_{12}$, and $R_{13}$, and so forth.

The net effect of the above connections is to arrange for direct correspondence of thyratron circuit having output $R_{00}$ with position $D_{00}$ of word $W_1$ on tape 140 in Fig. 2, correspondence of thyratron circuit having output $R_{01}$ with position $D_{01}$, etc.

Particular reference to thyratron circuit 284 will indicate that this is a coincidence type circuit, well known in the art, in which thyratron tube 280 is caused to fire when shield grid 281 and control grid 282 potentials are coincidentally appropriate. Once in a state of conduction, tube 280 maintains this state independent of further variations in grid potentials until the anode potential is removed or reduced. As shown, the plate 283 of thyratron 280 is connected by line 103 to the +225 v. supply in link 115 which is switched off by a clear signal from the computer transmitted prior to any information to be set up in register 116.

Returning to block #14 of Fig. 6 once more, it is seen that flip-flop K1, after a preset to the false state, is set true, after all the thyratron circuits have been set up, by signal $T_8$. The equation $n_1=K_1W_sD_sC_0$ is thereby made effective to change control unit 119 output to #15, during which block category searching is done.

The first statement made in block #15 indicates that tape 140 is started. As shown in Fig. 13, a schematic diagram of tape drive control 131, output #15 of control unit 119 is fed to relay driver amplifier circuit 126. Amplifier circuit 126 is normally cut off, but draws current when output #15 is high, thereby energizing the coil of solenoid 155a which, as previously described, causes forward motion of tape 140 at high speed. It should be noted that whenever tape 140 is at rest, multiple head 130 is positioned over portion $W_sD_s$ thereof (Fig. 2). Since clock signals C are not sensed by multiple head 130 until the end of this portion of tape 140, word counter 108 and digit counter 109 will commence their counting cycles coincident with the sensing of word $W_0$.

The next two statements in block #15 relate to the comparison of tape digits with register digits during word $W_1$.

In accordance with the scheme of the present invention, flip-flop K1 is used to indicate the results of a comparison: if false during period $W_sD_s$, the comparison made during word $W_1$ of the preceding block was unsuccessful, control unit 119 output is not changed, tape 140 continues to move, and the comparison is repeated for word $W_1$ of the next tape block; if true during period $W_sD_s$, the comparison made during word $W_1$ of the preceding block was successful, control unit 119 output is changed to #2, and tape 140 is stopped and reversed so as to be properly positioned for reading.

In order to accomplish this purpose, the presumption is made that the comparison for word $W_1$ of the next block sensed will be successful; thus, flip-flop K1 is set true at the beginning of word $W_0$:

$$k_1=W_0D_bC$$

If the presumption fails, flip-flop K1 is set false:

$$_0k_1=W_1D_{0-8}(M_1'B_1+M_2'B_2+M_3'B_3+M_4'B_4)C$$

In this equation, the term $W_1D_{0-8}$ restricts the triggering of the false grid of flip-flop K1 to word $W_1$ and digit periods $D_0$ to $D_8$, which, as has been shown, is the location of the category search information. The rest of the equation will be explained by reference to Figs. 7, 8, 9, and 10.

With reference first to reading out the digits stored in register 116, Fig. 7 shows the generation of timing propositions which order the reading-out process. Since the search is made during block #15 and for word $W_1$, these outputs, from control unit 119 and word counter 108, respectively, are logically multiplied in gate 127. The product $\#15W_1$ is fed as a term to a plurality of similar gates, such as gate 125, in each one of which it is logically multiplied by a different output from digit counter 109, such as output $D_0$ for gate 125. The products are fed to individual cathode followers, such as the output $\#15W_1D_0$ of gate 125, which is fed to cathode follower 124. The cathode followers are used to increase the current drain capacity of a circuit without inversion. Thus nine timing propositions, such as proposition $\#15W_1D_0$, are generated. Each of these propositions is employed, in Fig. 8, to gate the output of four thyratron circuits 284 storing four binary digits corresponding to four tape digits simultaneously sensed. Thus proposition $\#15W_1D_0$ is a term in the gates, such as gate 123, the other terms of which are supplied by thyratron circuits having outputs $R_{00}$, $R_{01}$, $R_{02}$, and $R_{03}$, the resulting four propositions being available in comparator 114 in coincidence with the binary signals from positions $D_{00}$, $D_{01}$, $D_{02}$, and $D_{03}$ of tape 140. Thus 36 output propositions are generated, one corresponding to each binary digit received from computer 100, such as proposition $\#15R_{00}W_1D_0$ corresponding to $T_0$ (Bit 0).

Fig. 9 shows further circuitry in register 116 employed to successively read out the 36 propositions, in groups of four, to the four outputs $B_1$, $B_2$, $B_3$, and $B_4$, respectively. The groups correspond to the nine groups of thyratron circuits. Thus, it is seen that the nine propositions $\#15R_{00}W_1D_0$, $\#15R_{10}W_1D_1$, $\#15R_{20}W_1D_2$, . . . $\#15R_{80}W_1D_8$ are logically combined in mixer 223, thereby comprising proposition $B_1$ which represents binary digits corresponding to (Bit 0) originally received on the same input line to register 116. It is noted that the summation is accomplished in groups of three propositions. This arrangement is preferred in order to limit the loading due to diode back currents on any one of the driving propositions for the sums in the network. The networks for the other propositions $B_2$, $B_3$, and $B_4$ are similarly arranged. The propositions $B_1$ to $B_4$, as represented by the equations shown, are fed to conventional cathode followers and thence to comparator 114 by line 164.

It has been pointed out in connection with Fig. 1 that comparator 114 also receives outputs $M_1'$, $M_2'$, $M_3'$, and $M_4'$ representing information sensed from tape 140 relevant to the category search operation. In addition, it has been observed that output $M_1'$ represents binary digits recorded in *Ch1*, output $M_2'$ represents binary digits recorded in *Ch2*, etc., each of these outputs being high when the recorded binary digit is a zero. Since the object of a category search is to check for a binary one on tape 140 for each binary one in register 116, the outputs $M_1'$, $M_2'$, $M_3'$, and $M_4'$ are compared with the propositions $B_1$, $B_2$, $B_3$, and $B_4$. This is accomplished in the comparator circuit shown in Fig. 10, where it is seen that the former outputs enter from reader 112 and the latter propositions enter from register 116. Each output, such as $M_1'$, and each proposition, such as $B_1$, is fed to a gate, such as gate 121, to form a product, such as $M_1'B_1$, which, if high, indicates that a binary one is set up in register 116 and there is no binary one to correspond thereto on tape 140. The outputs of the gates, namely, $M_1'B_1$, $M_2'B_2$, $M_3'B_3$, and $M_4'B_4$, are logically added in mixer 225, fed to a cathode follower C.F., and thence to the network shown in Fig. 12 as controlling the triggering of the false grid of flip-flop K1.

Returning to Fig. 6, it is thus seen that if there is a binary digit one on tape 140 in digit periods $D_0$ to $D_8$ during word $W_1$ for every binary digit one set up in register 116, flip-flop K1 will maintain the true state throughout the time that the block for which this condition is attained is passing multiple head 130. The term $W_sD_sC_0$ of the $_0k_1$ equation resets flip-flop K1 false during each blank area of tape 140 to prevent the maintenance of the true state if the comparison is successful. Simultaneously with the above action, flip-flops N1 to N4 of control unit 119 are triggered to produce output #2 during the period of the first $C_0$ pulse, for which flip-flop K1 is true.

Additionally, the equation $O_2'=K_1W_sD_sC_0$ is effective for the first multivibrator 154 clock pulse $C_0$ occurring for area $W_sD_s$ for which flip-flop K1 is true, i.e., a comparison has been successful. Reference to Fig. 13 will indicate that the coil of solenoid 151 which, as has been shown in connection with Fig. 1, causes reverse motion of tape 140 at high speed, is energized with current supplied by relay driver amplifier 129, of conventional design, and that amplifier 129 is caused to draw current when the output of gate 118 is high. The inputs to gate 118 comprise control unit output #2 and output $O_2$ of one-shot circuit 215. One-shot circuit 215 is of a type well understood as a multivibrator which accomplishes one complete cycle when triggered by a negative pulse. In other words, one-shot circuit 215 is normally in a state for which the output voltage $O_2$ is high and, when triggered, produces an output comprising a low voltage, $O_2'$, followed by the high voltage $O_2$, the former clamped at +100 v. and the latter clamped at +125 v. The time constants of the circuit are chosen such that the low voltage $O_2'$ exists for a period of time equivalent to that required by roller 139a (Fig. 1) to release tape 140 in order that, when roller 152 is caused to move, tape 140 will not be secured by both rollers at the same time.

Returning to Fig. 6 it will be understood that the delay introduced by one-shot circuit 215 prevents tape 140 from moving in the reverse direction until the output from control unit 119 is #2 and roller 139a is caused to release its pressure.

During the remainder of the time in block #2, tape 140 moves in the reverse direction. It should be noted that provision is made for proper generation of clock signal C as in the cited application, Serial No. 462,752, thereby providing for continuous count outputs from word counter 108 and digit counter 109.

The additional activity during block #2 is concerned with providing for sequencing back to block #0. It is noted that flip-flop K1 enters block #2 in the false state and is set true at period $W_0D_b$. Thus the true state during period $W_sD_s$ serves to trigger flip-flop N2 false: $_0n_2=K_1W_sD_sC_0$, which produces output #0 from control unit 119. Also, the output from gate 118 (Fig. 13) in tape drive control 131 becomes low, thereby cutting off current in amplifier 129 and causing the motion of tape 140 to stop. Thus, when block #0 is entered, tape 140 is in position such that the blank area prior to the block with information conforming with the category search test is beneath multiple head 130.

Reference will now be made to Fig. 16 which shows graphs depicting the activity of relevant components in the tape unit during a category search operation in which, for the left timewise block period, a successful search is found.

Line I of the figure, considered timewise, shows the period required for tape blocks to pass multiple head 130. Lines II and III present the corresponding word and digit counts. Next, on line IV, is shown signal C, generated from clock signals on tape 140 only when it is moving, as line VII indicates. On line V are multivibrator 154 signals $C_0$, which, it should be understood, are generated continuously, but of which only those trailing edges are shown which are gated so as to be effective in triggering relevant circuitry. Flip-flop K1 activity is drawn as line VI, the terms of the grid triggering equations effective to produce the states shown being given. It is seen that flip-flop K1 goes true with the fall of signal C at $W_0D_b$ and remains true until the fall of signal $C_0$ at $W_sD_s$. This occurs due to the fact that it was assumed that word $W_1$ of the tape block of concern here conforms with the category search criterion as represented by the term $$W_1D_{0-8}(M_1'B_1+M_2'B_2+M_3'B_3+M_4'B_4)$$

bearing a prime. Line VII indicates that tape 140 is not moving when control unit 119 output is #14 (line IX*a*) or #0 (line IX*d*) and that the motion of tape 140 is in the forward direction when control unit output #15 is effective (line IX*b*) and in the reverse direction during block #2 (line IX*c*) after one-shot output $O_2'$ is made ineffective (line VIII).

It may be noted that the invention may provide for causing tape 140 to halt such that multiple head 130 is positioned at $W_sD_s$ prior to the last block. If the second word thereof is magnetized such that a series of binary ones are fed to comparator 114 by reader 112 as this word is sensed, a binary one output from reader 112 will correspond to every binary one in register 116.

An illustration of the category search system of the present invention will next be given with particular reference to a recorded tape containing a loan company's file of $3000, two-year personal loans. Figs. 17 and 18 are sections of tape showing the recording of data units characterizing two such loans. In this file, a tape block is devoted to all data relevant to one account, which is identified by an account number recorded in address word $W_0$, and words $W_1$ of the blocks are arranged with binary digits to represent salient data units as follows:

*Table 1 (see Fig. 2)*

| | Data Units | Binary One In |
|---|---|---|
| Security available | Home furnishings | $D_{00}$ |
| | Business inventory | $D_{01}$ |
| | Automobile | $D_{02}$ |
| | Underwriter (comaker) | $D_{03}$ |
| Annual compound interest rate. | 5% | $D_{10}$ |
| | 6% | $D_{11}$ |
| | 7% | $D_{12}$ |
| | 8% | $D_{13}$ |
| Monthly payment schedule | 1st payment | $D_{20}$ |
| | 2nd payment | $D_{21}$ |
| | 3rd payment | $D_{22}$ |
| | * * * | * * * |
| | 24th payment | $D_{73}$ |
| Not used (may be one or zero) | | $D_{80}$ * * * $D_{88}$ |

Fig. 17 shows the original tape recording made on the day of a $3000 loan, Account Number 21,496 characterized as secured by a mortgage on an automobile owned by the borrower and also the promissory note of a comaker, bearing an interest rate of 6% componded per annum, to be repaid in 24 equal monthly payments. It is noted that, initially all 24 positions corresponding to the monthly payment schedule contain binary one recordings. For each payment made, a payment credit slip is accumulated in the company and, at the end of a business period, an address search is run to locate, by account number, the tape block containing the account statistics. When the account is found, a binary digit one recording in the monthly payment schedule is changed to a binary digit zero recording for each credit slip on hand for the period. Thus if, for a three-month period, three payments have been made (the account is up-to-date), positions $D_{20}$, $D_{21}$, and $D_{22}$ will contain zeros, as in Account Number 21,481 in Fig. 18; if two payments have been made (one month's delinquency), positions $D_{20}$ and $D_{21}$ will contain zeros, as in Account Number 21,496 of Fig. 18; if one payment only has been made (two months' deliquency), position $D_{20}$ only will contain a zero; and if no payments have been made (three months' delinquency), the account will appear as originally recorded in Fig. 17.

At the end of a business period, if the object of the loan company is to issue delinquency notices to all $3000, 6% interest, two-year personal loan accounts that are overdue one month, the computer is programmed to transmit category search signal $S_1$ to the tape unit followed by the category search information, the latter comprised of signals representing the data units to be sought. Upon receipt of signal $S_1$, control unit 119 will start to sequence the tape unit through the operations represented in the flow diagram of Fig. 6.

When block #14 is entered, register 116 will be made receptive to the category search information signals and will be set up as follows:

*Table II (see Fig. 8)*

| | Thyratron Circuit | Set Up With Binary |
|---|---|---|
| Storage for security data units | $R_{00}$ | 0 |
| | $R_{01}$ | 0 |
| | $R_{02}$ | 1 |
| | $R_{03}$ | 1 |
| Storage for interest rate data units | $R_{10}$ | 0 |
| | $R_{11}$ | 1 |
| | $R_{12}$ | 0 |
| | $R_{13}$ | 0 |
| Storage for payment schedule data units | $R_{20}$ | 0 |
| | $R_{21}$ | 0 |
| | $R_{22}$ | 1 |
| | . | . |
| | . | . |
| | . | . |
| | $R_{73}$ | 1 |
| Not used | $R_{80}$ | 0 |
| | . | . |
| | . | . |
| | . | . |
| | $R_{83}$ | 0 |

For this example, it will be assumed that the tape is at rest with the multiple head at position $W_8D_8$ of the block containing Account Number 21,481 data (Fig. 18).

During block #14 flip-flop K1 will be triggered true upon the receipt of the last timing signal, $T_8$, from the computer. Thus, output #15 will be set up by control unit 119, flip-flop K1 will be reset false, and tape drive control 131 will be caused to energize solenoid **155*a*. The tape will be set in motion in the forward direction and multiple head 130 will commence to sense the recorded pattern and transmit appropriate signals to reader 112**.

At period $W_0D_b$ of block #15, flip-flop K1 will be preset true. When word $W_1$ is being sensed, reader 112 will transmit the tape signals as propositions $M_1'$, $M_2'$, $M_3'$, and $M_4'$, corresponding to the recordings in positions $D_{00}$ to $D_{80}$, $D_{01}$ to $D_{81}$, $D_{02}$ to $D_{82}$, and $D_{03}$ to $D_{83}$, respectively of the tape, to comparator 114.

It will be remembered that in the category search operation, comparator 114 will regard words $W_1$ of every block on the tape and effectively compare the position $D_{00}$ signal with the register $R_{00}$ signal, the position $D_{01}$ signal with the register $R_{01}$ signal, etc. until, for each binary one set up in register 116, there is a corresponding binary one on the tape; and when this condition obtains, thereby indicating that the recorded account possesses the desired characteristics as represented by the data units set up in register 116, flip-flop K1 will not be triggered false. It will be observed from Table II and Fig. 18 that, for periods $D_0$ and $D_1$ of word $W_1$ of the 21,481 block, the content of the tape and the content of register 116 are matched. Thus, flip-flop K1 will be true when period $D_2$, the first period relevant to the monthly payment schedule, is entered. Table III details period $D_2$ and shows that, for position $D_{22}$ and thyratron circuit having output $R_{22}$, the term $(M_3'B_3)$ of the $_0k_1$ equation will be high. Therefore, flip-flop K1 will be set false at period $D_2$ and will remain false until period $W_0D_b$ of the block with Account Number 21,496 data. Output #15 from control unit 119 will remain high and the tape will not stop.

*Table III*

| | Reader 112 | | Register 116 | | Comparator 114 | | | | K1 |
|---|---|---|---|---|---|---|---|---|---|
| | | | | | $M_1'B_1$ | $M_2'B_2$ | $M_3'B_3$ | $M_4'B_4$ | |
| Account Number 21,481 | $D_{20}=0$ | $M_1'=1$ | $R_{20}=0$ | $B_1=0$ | 0 | | | | 1 |
| | $D_{21}=0$ | $M_2'=1$ | $R_{21}=0$ | $B_2=0$ | | 0 | | | 1 |
| | $D_{22}=0$ | $M_3'=1$ | $R_{22}=1$ | $B_3=1$ | | | 1 | | 0 |
| | $D_{23}=1$ | $M_4'=0$ | $R_{23}=1$ | $B_4=1$ | | | | 0 | 0 |
| Account Number 21,496 | $D_{20}=0$ | $M_1'=1$ | $R_{20}=0$ | $B_1=0$ | 0 | | | | 1 |
| | $D_{21}=0$ | $M_2'=1$ | $R_{21}=0$ | $B_2=0$ | | 0 | | | 1 |
| | $D_{22}=1$ | $M_3'=0$ | $R_{22}=1$ | $B_3=1$ | | | 0 | | 1 |
| | $D_{23}=1$ | $M_4'=0$ | $R_{23}=1$ | $B_4=1$ | | | | 0 | 1 |

Activity for the 21,496 block can be similarly traced. Briefly, from Table III, it is seen that there is a correspondence of binary ones in the tape content and the register content, none of the listed comparator terms will be high and flip-flop K1 will maintain the true state throughout the time that this tape block is being sensed.

The true state of flip-flop K1 at period $W_8D_8$ of the succeeding tape block will cause control unit 119 to produce output #2. Solenoid **155*a* will be deactivated and the tape will stop. After the delay introduced by one-shot $O_2'$, solenoid 151 will be activated and the tape will move in the reverse direction. Flip-flop K1 will be preset true at period $W_0D_b$ of the 21,496 block, causing the output of control unit 119 to change to #0 at $W_8D_8$, thereby deactivating solenoid 151** and stopping the tape. The tape unit will thus be ready for a signal from the computer which will direct the reading out of the block numbered 21,496.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. Apparatus for scanning a magnetic tape file for all accounts recorded thereon having predetermined characteristics in common, the magnetic tape having recorded on successive areas thereof signals descriptive of respective ones of said accounts, comprising: a reading device for reproducing signals recorded on the tape; means for moving said tape past said reading device; a register for storing signals representing said predetermined characteristics; means effective to compare the signals reproduced from the tape with the signals stored in said register and for producing a control signal in response to an identity in the compared signals; and means responsive to said control signal for reversely moving said tape to the beginning of the account being read to permit the reading device to read the recording of each account having signals thereon corresponding to signals in the register.

2. Apparatus for scanning a magnetic tape file for all accounts recorded thereon meeting an established set of characteristics, said magnetic tape having recorded on successive areas thereof signals descriptive of each said account, comprising: a reading device; means for moving said tape past said reading device; a register for storing signals defining the positions in the accounts in which the characteristic signals may be stored; means for reversing the direction of motion of said tape for each account recording being scanned having signals thereon corresponding to signals in the register; and means for stopping the tape with the reading device positioned at the beginning of each said account recording.

3. An information retrieval system for operating with a magnetic tape having recorded on successive areas thereof information signals descriptive of a business transaction, said information including signals representing characteristics of each said transaction, comprising: sensing means for the signals on said tape; control means for moving said tape in a forward direction relative to said sensing means; a storage register for a plurality of binary signals, each signal representing a possible characteristic of the business transactions recorded on the tape; means for matching the signals in said register with the characteristic signals of each business transaction as sensed by said sensing means; and further control means for backing up said tape to position said sensing means at the beginning of each business transaction recording when said matching means indicates that there is a signal on said tape corresponding to each signal in said register.

4. An information retrieval system operable to scan a file of individual transactional accounts maintained as magnetic recordings on a medium such as a magnetic tape, an area of the tape in each account being reserved for a plurality of binary recordings, each representing a predetermined characteristic of the accounts, comprising: a reader for sensing the account recordings on the tape and having an electrical signal output corresponding to each magnetic recording representing a characteristic of the account; a register set up from an external source with one or a plurality of signals each representing a predetermined characteristic for which the account file is to be scanned and having an electrical signal output corresponding to each signal set up therein; a logical network for comparing each signal output from said register with the corresponding signal output from said reader; and means to reposition said reader relative to said tape for reading out the magnetic signals of each account for which said logical network indicates that a signal is recorded on the tape corresponding to each signal set up in said register.

5. An information retrieval system operable to scan a file of individual transactional accounts maintained as magnetic recordings on a medium such as a magnetic tape, an area of the tape in each account being reserved for a plurality of binary recordings, each representing a characteristic of the accounts, comprising: means for moving the tape in a forward direction; a reader for sensing the binary recordings on the moving tape representing characteristics of the accounts and having an electrical signal output corresponding to each binary "zero" recording; a register set up from an external source with one or a plurality of binary "one" signals each representing a characteristic for which the account file is to be scanned and having an electrical signal output corresponding to each binary "one" signal set up therein; a logical network for generating a signal output when an electrical signal is on the outputs of both said reader and said register; a flip-flop circuit settable in a first state at the beginning of an account scanning and capable of being triggered into a second state in response to an output from said logical network; and means responsive to the outputs of said flip-flop circuit after each account is scanned to reposition said reader relative to said tape for reading out the magnetic signals of an account when said flip-flop circuit is in said first state, and to continue moving said tape in a forward direction to scan the next account when said flip-flop circuit is in the second state.

6. Apparatus for scanning a magnetic tape file for enabling the reading of all account recordings thereon having predetermined characteristics in common, the magnetic tape having recorded on successive areas thereof signals descriptive of each said account, comprising: a register; a control unit having a plurality of outputs; a first circuit means responsive to an output of said control unit for storing signals in said register received from an outside source, said signals defining positions in the accounts in which the characteristic signals may be stored; a sensing means for sensing the signals on said tape; a second circuit means responsive to an output of said control unit for moving said tape and matching the signals in said register with the characteristic signals of each account as sensed by said sensing means; and a third circuit means responsive to an output of said control unit for backing up said tape to position said sensing means at the beginning of each account recording when said matching means indicates that there is a signal on said tape corresponding to each signal in said register.

7. An information retrieval system for operating with a magnetic tape having recorded on successive areas thereof information signals descriptive of a business transaction, said information including signals representing characteristics of each said transaction, comprising: sensing means for the signals on said tape; control means capable of being energized to move said tape in a forward or reverse direction relative to said sensing means; a storage register for a plurality of signals, each signal representing a possible characteristic of the business transactions recorded on the tape; means operable when said control means is energized to move said tape in a forward direction for matching the signals in said register with the characteristic signals of each business transaction as sensed by said sensing means; means operable when said matching means indicates that there is a signal on said tape corresponding to each signal in said register to energize said control means to move said tape in a reverse direction until said sensing means is positioned at the beginning of the business transaction recording; and delay means operable to delay the energizing of the control means to move said tape in said reverse direction.

8. An information retrieval system for operating with a magnetic tape having recorded in discrete position areas thereof information signals descriptive of a plurality of business transactions including signals representing characteristics of each transaction, comprising: sensing means for the signals on said tape; tape control means for controlling the motion of said tape relative to said sensing means; a register for a plurality of signals, each signal representing a possible characteristic of the business transactions recorded on said tape; comparing means operable when said tape control means is moving said tape in a forward direction for comparing the signals in said register with the characteristic signals sensed by said sensing means; means operating in response to said comparing means when said tape is moving in said forward direction to cause said tape control means to reverse the direction of said tape when the business transaction recording being scanned by said sensing means includes a signal corresponding to each signal in said register; and means operating independently of said comparing means when said tape is moving in a reverse direction to cause said tape control means to stop said tape with said sensing means at the beginning of a business transaction recording.

9. Apparatus for selecting items of data having common characteristics from a plurality of items of data recorded on a tape storage medium including driving means for feeding the medium in either a forward or reverse direction past a sensing device adapted, in response to the feeding of the tape in a forward direction, to generate signals indicative of data recorded on the tape, said apparatus comprising: a program control unit adapted to operate in predetermined sequential steps, and to produce output signals indicative of such predetermined steps; a register adapted, in response to a signal indicative of the first step of the control unit, to be set up with a digital content representing signals having standard characteristics; and a comparator adapted, in response to a signal indicative of the second step of the control unit, to effect forward movement of the tape and to compare signals received during a period of time from said sensing device and from said register, said comparator including a decision device adapted to control the sequential stepping of the control unit to a third step, dependent upon the result of the comparison between the signals received by the comparator, said driving means being operated, in response to a signal indicative of the third step of the control unit to reverse the direction of the tape, whereby the control unit is stepped to the third step thereof, to effect reversal and subsequent interruption of tape feed, only when there is a characteristic signal on the tape corresponding to each characteristic signal set up in the register.

10. Apparatus for scanning a magnetic-tape information file for an information block comprising information represented by a predetermined pattern of recorded binary signals, each information block of the tape being spaced from any next-adjacent information blocks by a blank area of the tape not having recorded information, said apparatus comprising: reading means for reading the tape; means for moving the tape past said reading means in the reading direction and providing signals representing the recorded information; means for storing binary signals having said predetermined pattern; signal comparison means for comparing with the stored signals the signals provided by said reading means; and means responsive to a correspondence of compared signals in said signal comparison means for rendering ineffective said means for moving the tape in the reading direction, and for reversely moving the tape to a position for reading of the commencement of the information block comprising said predetermined pattern of recorded binary signals.

11. Apparatus for locating in a magnetic-tape information-file comprising magnetically recorded information blocks each block of which comprises records of a plurality of categories of information, each category defined by a respective configuration of recorded signals, all those recorded blocks containing a predetermined set of categories of information, comprising first means to selectively move the tape in a forward direction in response to a first control signal and in reverse direction to the commencement of the block being read, in response to a second control signal; second means to read said tape and produce in response to forward motion of the tape, successive series of signals each series representing the information of a respective block; third means providing a set of signals defining said predetermined set of categories of information; means to supply a first control signal to said first means; means for comparing the signals produced by said second means with those provided by said third means and effective to produce a said second control signal in response to an identity in the comparison, whereby upon occurrence of said identity said tape is reversely moved to the beginning of the block being read, and to a position for subsequent reading of the block of recorded information which includes said predetermined set of categories.

12. Apparatus for utilizing a magnetic tape having recorded thereon blocks of information each block of which is separated from next-adjacent blocks by an information-free blank area and each of at least some blocks of which include a plurality of categories of information each category of which is uniquely represented by a respective pattern of recorded binary signals, said apparatus being adapted to locate and position for reading the next information block, in the reading direction of the tape, containing a prescribed particular set of one or more of said categories of information, and said apparatus comprising: first means to move the tape forwardly in the reading direction in response to receipt of a first type of control signal, and backwardly in the reverse direction to the next-reached blank area in response to receipt of a second type of control signal; second means to provide to said first means a control signal of the first type; third means to read said tape and provide signals corresponding to the respective categories of recorded information; fourth means effective to supply a set of signals corresponding to said prescribed set of said categories of information desired to be located in the tape; and fifth means effective to compare the set of signals supplied by said fourth means with signals produced by said third means and in response to a successful comparison to supply to said first means a control signal of the second type, whereby upon reading in an information block the prescribed set of categories of information the movement of the tape is reversed and the tape positioned for subsequent reading of that information block.

13. In a data-processing system operating with information recorded in spatially-separated information-block areas of a magnetic tape, each such information-block area being separated from any next-adjacent information-block area by an intervening information-free blank area, and the information recorded in at least some of said block areas including a set of at least one category of information specifically represented by a respective unique pattern of recorded binary signals, means for locating and positioning for reading, the next information block of the tape containing such unique pattern of recorded binary signals, comprising: first means effective to move the tape in forward reading, and reverse, directions, in response to first and second types of control signals, respectively; second means effective to provide to said first means a control signal of the first type to move the tape forward in the reading direction; third means effective to read the tape and provide signals corresponding to the recorded binary signals; fourth means effective to furnish a set of signals corresponding to said unique pattern of recorded binary signals; and fifth means effective to compare the signals provided by said third means with the signals furnished by said fourth means and to provide to said first means a control signal of said second type incident to correspondence of the said provided signals and said furnished set of signals, whereby the tape is reversely moved to position the tape for reading of the information block comprising said unique pattern of recorded signals.

References Cited in the file of this patent

UNITED STATES PATENTS 2,575,034 Tyler ---------------- Nov. 13, 1951